(12) United States Patent
Hettich

(10) Patent No.: US 8,337,131 B2
(45) Date of Patent: Dec. 25, 2012

(54) HEAD OF A COUNTERSUNK SCREW

(75) Inventor: Ulrich Hettich, Schramberg (DE)

(73) Assignee: Ludwig Hettich & Co., Schramberg-Sulgen (DE)

( * ) Notice: Subject to any disclaimer, the term of this patent is extended or adjusted under 35 U.S.C. 154(b) by 403 days.

(21) Appl. No.: 12/525,607

(22) PCT Filed: Jan. 17, 2008

(86) PCT No.: PCT/EP2008/000354
§ 371 (c)(1),
(2), (4) Date: Feb. 17, 2010

(87) PCT Pub. No.: WO2008/095593
PCT Pub. Date: Aug. 14, 2008

(65) Prior Publication Data
US 2010/0143070 A1    Jun. 10, 2010

(30) Foreign Application Priority Data

Feb. 5, 2007   (DE) .......................... 10 2007 005 677

(51) Int. Cl.
*F16B 35/06*   (2006.01)
(52) U.S. Cl. ....................................... 411/399
(58) Field of Classification Search ................... 411/399, 411/187, 188
See application file for complete search history.

(56) References Cited

U.S. PATENT DOCUMENTS

| | | | | |
|---|---|---|---|---|
| 3,903,784 A | * | 9/1975 | Dekker | 411/399 |
| 5,015,134 A | * | 5/1991 | Gotoh | 411/386 |
| 5,772,376 A | | 6/1998 | Konig | |
| RE36,741 E | * | 6/2000 | Walther et al. | 411/399 |
| 6,558,097 B2 | * | 5/2003 | Mallet et al. | 411/399 |
| 7,334,976 B2 | * | 2/2008 | Dicke | 411/399 |
| 7,604,445 B1 | | 10/2009 | Dicke | |
| 2009/0123253 A1 | * | 5/2009 | Hettich | 411/399 |
| 2010/0158634 A1 | * | 6/2010 | Walther | 411/399 |

FOREIGN PATENT DOCUMENTS

| | | |
|---|---|---|
| AU | 19877/76 | 1/1978 |
| DE | 3334212 A1 | 4/1985 |

(Continued)

OTHER PUBLICATIONS

Vorwort, Hans-Hebert Monnig Verlag, Iserlohn, Herausgeber: Deutscher Schrauberverband e.V., Hagen, 1993.

(Continued)

*Primary Examiner* — Flemming Saether

(74) *Attorney, Agent, or Firm* — Duane Morris LLP

(57) ABSTRACT

The invention relates to the head of a countersunk screw with a lower side which has at least one supporting surface, which forms part of a rotational surface about the screw axis and can nestle against a correspondingly contoured countersunk surface of an add-on part, and has at least one depression which is delimited by a cutting edge at its end which runs downwards, as seen in the screwing-in direction of the countersunk screw. The invention is distinguished in that in front of the supporting surface, as seen in the screwing-in direction, there is an approach surface which butts against said supporting surface, is inclined radially inwards and, at its upwardly running, free end, has the cutting edge which, over its length, maintains a radial distance from the rotational surface to the inside.

6 Claims, 3 Drawing Sheets

FOREIGN PATENT DOCUMENTS

| | | |
|---|---|---|
| DE | 29600065 U1 | 3/1996 |
| DE | 29508852 U1 | 9/1996 |
| DE | 29906200 U1 | 9/2000 |
| DE | 102006023708 B3 | 5/2006 |
| EP | 1152157 A1 | 11/2001 |
| GB | 2382854 A | 2/2002 |

OTHER PUBLICATIONS

European Patent Office, International Search Report in corresponding International Application Serial No. PCT/EP2008/000354, dated Apr. 24, 2008.

* cited by examiner

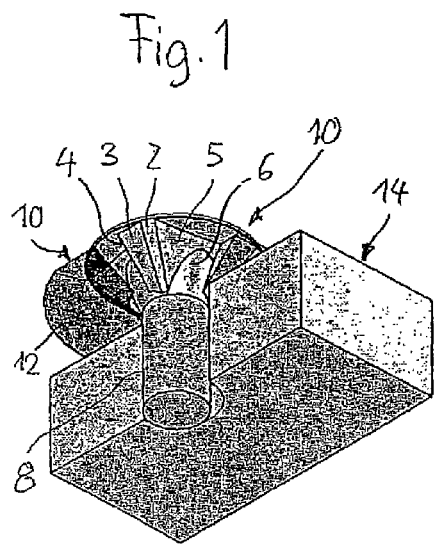
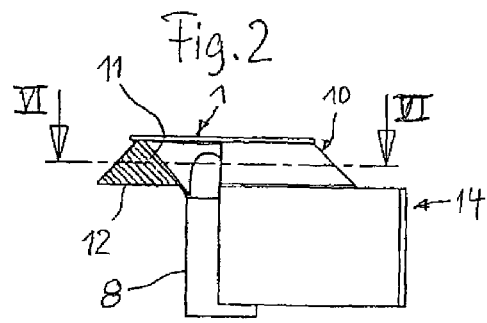
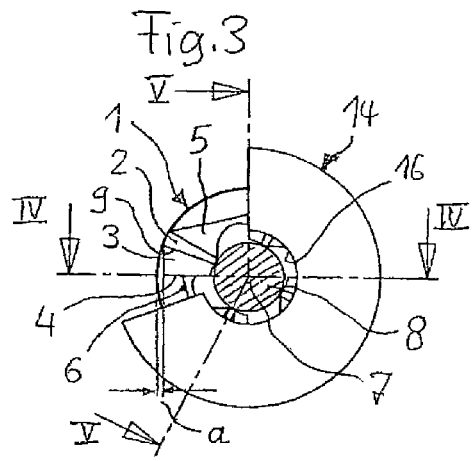
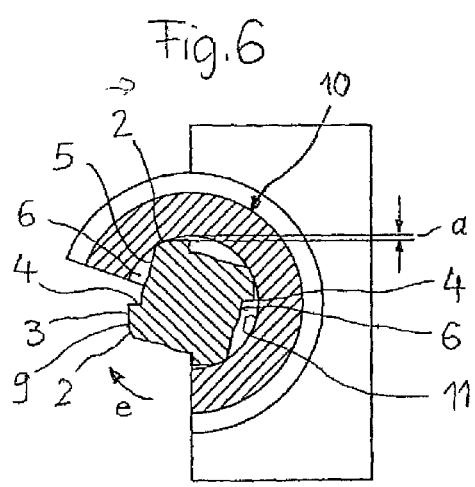
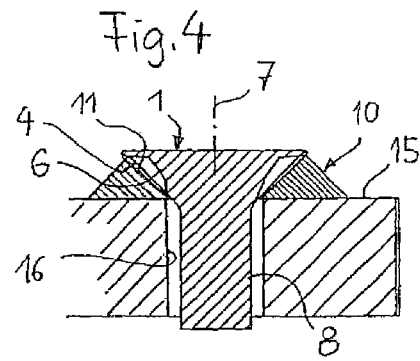
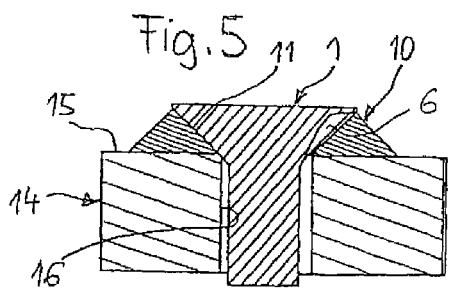

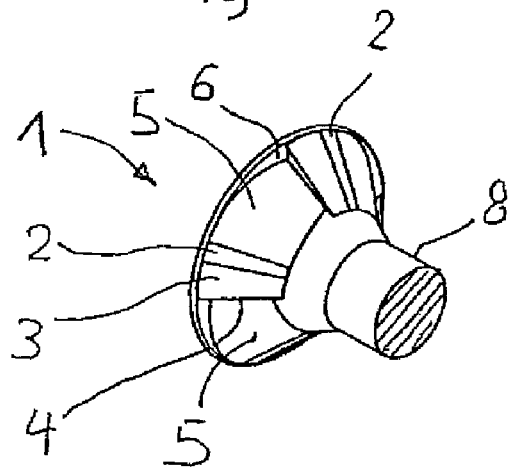
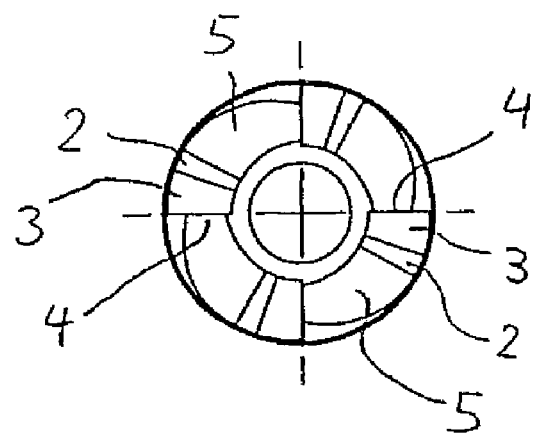
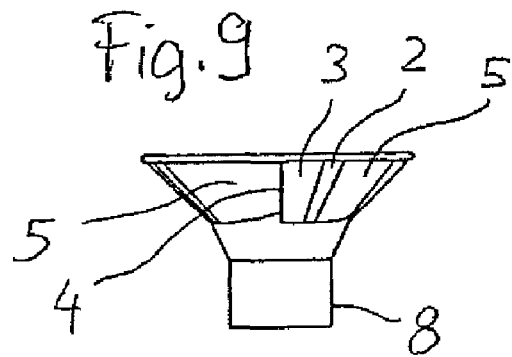

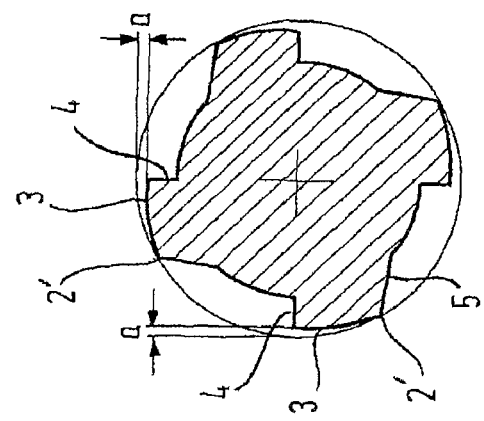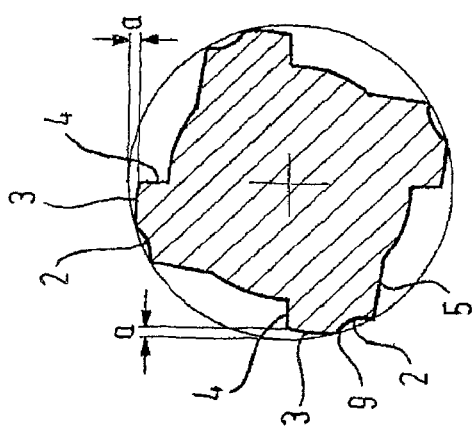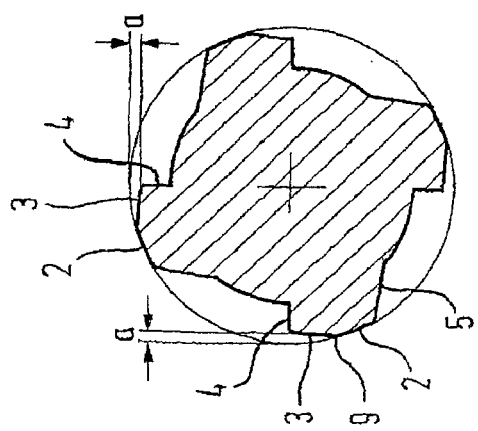

HEAD OF A COUNTERSUNK SCREW

BACKGROUND

The invention relates to the head of a countersunk screw with an underside which has at least one support surface or edge, which support surface or edge forms part of a rotational surface around the screw axis and can cling to a correspondingly contoured countersunk surface of an add-on part, and at least one depression, which depression is delimited by a cutting edge at its trailing end, as seen in the screwing-in direction of the countersunk screw.

In the case of the known countersunk screw with a head of this type, the cutting edge delimits the leading end region of the support surface and is therefore located in the rotational surface. Should the screw be screwed into a prefabricated countersunk surface of a metallic add-on part, then the cutting edge can damage this countersunk surface, in particular coatings of the countersunk surface for improving the corrosion resistance, such as galvanic or inorganic metal layers or even plastic coatings (DE 33 34 212 A1).

The object of the invention is to construct the head of a countersunk screw of the type described at the beginning in such a manner that, on the one hand, when being screwed into soft material such as wood, the cutting edges can create their countersunk surface or a blocking action themselves and, on the other hand, when being screwed into metallic add-on parts with prefabricated countersinks, the cutting edges cannot damage the surface thereof.

Patent Claim 1 serves to achieve this object, according to which claim, a radially inwardly inclined advancing surface which abuts the support surface is arranged on a head of a countersunk screw according to the invention downstream of the said support surface as seen in the screwing-in direction, which advancing surface has the cutting surface at its leading free end, which cutting surface maintains an inward radial distance from the rotational surface over its length.

In the case of a head of a countersunk screw according to the invention, the cutting edge does not delimit the support surface, but rather an advancing surface, which preferably continuously adjoins the support surface in the screwing-in direction and is radially inwardly inclined.

As the countersunk surface coincides with the rotational surface in the screwed-in position of the screw, but does not run further radially inwards, the cutting edge keeps a radial distance from the countersunk surface over its entire length, so that the cutting edge cannot touch the countersunk surface or a coating applied thereto and therefore cannot damage the same. This distance can increase from the inside to the outside, as seen over the length of the cutting surface.

Nonetheless, it is also ensured in the case of the screw according to the invention that, in the case of use of the countersunk screw in soft material such as wood, the head creates the countersink itself by means of the cutting edge during screwing in of the countersunk screw.

It is preferred that each advancing surface continuously adjoins the support surface or edge assigned to it, preferably with a rounding.

Advantageous embodiments of the invention are described in the sub-claims.

BRIEF DESCRIPTION OF THE DRAWINGS

The invention is explained hereinafter more clearly with further details by means of schematic drawings. In the figures:

FIGS. 1 to 6 show a first configuration of the head of a countersunk head screw according to the invention, namely FIG. 1 shows a perspective view of a countersunk screw drawn broken away and without a threaded part with a view of the head shaped according to the invention from obliquely below, wherein the head abuts an add-on part drawn broken away and darkly shaded and the shaft of the screw extends through aligned holes in the add-on part and in a component which is likewise drawn broken away;

FIG. 2 shows a side view of the illustration according to FIG. 1 with add-on part and component broken away;

FIG. 3 shows a view from below with add-on part and component broken away to allow the view onto a section of the underside of the head;

FIG. 4 shows a section according to the line IV-IV in FIG. 3;

FIG. 5 shows a section according to the line V-V in FIG. 3; and

FIG. 6 shows a section according to the line VI-VI in FIG. 2.

FIGS. 7 to 9 show a further configuration of the head of a countersunk screw according to the invention, wherein FIG. 7 illustrates a perspective view from below of the head;

FIG. 8 illustrates a view from below of the screw and head; and

FIG. 9 illustrates a side view of the screw according to FIGS. 7 and 8.

FIGS. 10, 11 and 12 illustrate in sections taken along line VI-VI in FIG. 2 different embodiments of a countersunk screw according to the invention.

In FIGS. 7 to 12, functionally identical parts have been assigned the same reference numbers as in FIGS. 1 to 6.

DETAILED DESCRIPTION

FIGS. 1 to 5 show the combination of a countersunk screw with head 1, the shaft 8 of which screw protrudes through an annular add-on part 10 and then through a hole 16 of the component 14, such as a fitting or a wood slat, and the threaded end (not shown) of the shaft 8 of which screw is screwed into a base (likewise not shown) such as a wall. The head 1 of the countersunk screw has four support surfaces 2 evenly distributed around its circumference on its underside, which support surfaces are entirely arranged on a rotational surface, here on a conical surface, around the screw axis 7. The screw clings to a correspondingly conical countersunk surface 11 of the add-on part 10 by means of these support surfaces 2 in the screwed-in state shown. As seen in the screwing-in direction e of the countersunk screw, an advancing surface 3 is arranged downstream of each support surface 2 in each case. Each advancing surface 3 is radially inwardly inclined and has a cutting edge 4 along its leading free end. This cutting edge 4 is radially inwardly arranged at a distance a (FIGS. 3, 4 and 6) from the countersunk surface 11 on account of the inclination of the advancing surface 3, wherein this distance a increases continuously starting from the beginning at the shaft 8 in the direction to the largest head diameter.

A depression 6 is arranged upstream of each support surface 2 in the screwing-in direction, the trailing edge of which depression extends to the next cutting edge 4 and has a flank 5 as a base. This flank 5 can be planar or even partially curved, as can be seen in profile from the section VI-VI according to FIG. 6.

If a countersunk screw with a head is screwed through the add-on part 10 and the component 14 into the base (not shown), then the cutting edge 4 does not come into contact with the countersunk surface 11 and therefore cannot damage the said surface or a coating located thereon.

If, on the other hand, a countersunk screw with a head 1 according to the invention is screwed into a soft material, such as wood, its head 1 creates a countersink itself with its cutting edges 4.

The countersunk screw according to FIGS. 7 to 9 differs from that according to FIGS. 1 to 6 solely by means of a different shaping of the flank 5 and therefore of the depression 6. The flank 5 is here located on a separate conical lateral surface in each case, the axis of which runs crookedly to the screw axis 7. A shaping of the head 1 of this type enables a simple production of the countersunk screw.

The advancing surfaces 3, at the free ends of which the cutting edges 4 are located, can be curved in any desired manner, but can also be configured in a planar manner, as shown in FIGS. 3 and 10. Also, they can be formed by conical surfaces, as shown in FIGS. 6, 11 and 12.

The support surface can adjoin the advancing surface by means of a edge, as is illustrated in FIGS. 6, 10 and 11 and designated with reference numeral 9. It is preferred, however, if the transition from the support surace 2 to the advancing surface 3 is smooth, that is to say edge-free, in order to avoid damaging the countersunk surface 11 in this manner also. A smooth transition of this type can be realised by a specially provided rounding.

The support surface 2 is kept comparatively narrow in the configurations shown, but can be wiser or even narrower in the circumferential direction and in an extreme case shrink to a supporting edge 2' as shown in FIG. 12 which then forms a direct transition between advancing surface 3 and flank 5 which is also then rounded. A configuration of this type with support edges instead of support surfaces makes sense particularly in the case of a head according to FIGS. 7 and 9 with the flanks 5 constructed as conical lateral surfaces.

The features disclosed in the above description, the claims, and the drawings can be of significance individually as well as in any combination for the implementation of the invention in its different embodiments.

REFERENCE LIST

1 Head
2 Support surface
3 Advancing surface
4 Cutting edge
5 Flank
6 Depression
7 Screw axis
8 Shaft
9 Edge
10 Add-on part
11 Countersunk surface of the add-on part
12 Underside of the add-on part
14 Component
15 Surface of the component
16 Hole
a Distance between the cutting edge and rotational surface
e Screwing-in direction

The invention claimed is:

1. Head of a countersunk screw with an underside which has at least one support surface edge which support surface edge is part of a rotational surface around the screw axis and can cling to a correspondingly contoured countersunk surface of an add-on part, and at least one depression, which depression is delimited by a cutting edge at its trailing end, as seen in the screwing-in direction of the countersunk screw, characterized in that a radially inwardly inclined advancing surface which abuts the support surface is arranged downstream of the said support surface as seen in the screwing-in direction which advancing surface has the cutting surface at its leading free end, which cutting surface maintains an inward radial distance from the rotational surface over its length.

2. Head according to claim 1, characterized in that the trailing end of the advancing surface continuously adjoins the support surface.

3. Head according to claim 1, characterized in that the support surface is part of a conical surface.

4. Head according to claim 1, characterized in that the support surface is concavely curved.

5. Head according to claim 1, characterized in that the advancing surface is part of a conical surface.

6. Head according to claim 1, characterized in that a flank is arranged upstream of the support surface as seen in the screwing-in direction.

* * * * *

UNITED STATES PATENT AND TRADEMARK OFFICE
CERTIFICATE OF CORRECTION

PATENT NO. : 8,337,131 B2
APPLICATION NO. : 12/525607
DATED : December 25, 2012
INVENTOR(S) : Ulrich Hettich It is certified that error appears in the above-identified patent and that said Letters Patent is hereby corrected as shown below:

In Claim 1, line 18, insert --or-- between "surface" and "edge."

In Claim 1, line 19, insert --or-- before "edge."

Signed and Sealed this
Fifth Day of March, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,337,131 B2  
APPLICATION NO. : 12/525607  
DATED : December 25, 2012  
INVENTOR(S) : Ulrich Hettich Page 1 of 1

It is certified that error appears in the above-identified patent and that said Letters Patent is hereby corrected as shown below:

IN THE CLAIMS

In Claim 1, Column 4, line 18, insert --or-- between "surface" and "edge."

In Claim 1, Column 4, line 19, insert --or-- before "edge."

This certificate supersedes the Certificate of Correction issued March 5, 2013.

Signed and Sealed this  
Ninth Day of April, 2013

Teresa Stanek Rea  
*Acting Director of the United States Patent and Trademark Office*